United States Patent Office 3,463,772
Patented Aug. 26, 1969

3,463,772
SYNTHESIS OF 3'→5' LINKED ARABINO-OLIGONUCLEOTIDES
Joseph Nagyvary, Omaha, Neb., assignor to the United States of America as represented by the Secretary of Health, Education, and Welfare
No Drawing. Filed Nov. 21, 1967, Ser. No. 684,609
Int. Cl. C07d 51/50
U.S. Cl. 260—211.5
4 Claims

ABSTRACT OF THE DISCLOSURE

3'→5' linked arabino-oligonucleotides are prepared by a method that eliminates the utilization of the scarce arabino-nucleoside as a starting material. The triesters of the pyrimidine nucleoside 2',3'-cyclic phosphates can completely undergo a rearrangement to diesters containing $O^2,2'$-cyclonucleosides. Alkaline hydrolysis of these labile intermediates produces the desired arabino-nucleosides. Oligonucleotides consisting of a homologous sequence of cytosine-arabinoside phosphates and of uracil-arabinoside phosphates, respectively, and ending in various nucleosides such as thymidine and uridine were obtained in about 50% yield based on the nucleoside 2',3'-cyclic phosphate.

BACKGROUND OF THE INVENTION

The present invention relates to the synthesis of 3'→5' linked arabino-oligonucleotides, and has as its object to provide a new and improved chemical process for effecting such synthesis.

The availability of such compounds will open the way for many interesting biochemical investigations. A direct benefit for the treatment of neoplastic and viral diseases is also expected due to these compounds. The cytotoxicity of thirty nucleotide and dinucleoside phosphate derivatives of Ara-cytidine (Ca) against KB human carcinoma and L-5178Y mouse leukemia cells was recently studied and reported (C. G. Smith, "Cytotoxicity Studies with Analogues and Derivatives of Ara-cytidine," 152 Meeting of the American Chemical Society, P-018, September 1966). 3'→5' dinucleoside phosphates of Ca with normal nucleosides were found to inhibit KB cells. Of 17 derivatives tested against a sensitive strain of L-5178Y and its "Kinaseless" mutant, complete cross-resistance was observed with all but two.

At the same American Chemical Society Meeting, it was also reported that Ara-cytidine has been shown to have antiviral activity against a broad spectrum of DNA containing viruses. The antiviral activity of several phosphorylated derivatives containing Ca, including a variety of dinucleoside phosphates, has been studied both in vitro and in vivo. The 3'→5' linked dinucloside phosphates were found to be the most active among the derivatives (Harold E. Renis, "Antiviral Studies with Nucleotides and Dinucleoside Phosphates Containing Ara-Cytidine," 152 Meeting of the American Chemical Society, P-019, September 1966).

Because of the usefulness of the 3'→5' linked arabino-oligonucleotides, an economical and practical method of synthesis was sought. The synthesis of olignoucleotides containing D-arabinose poses a formidable problem to the organic chemist, since such compounds cannot be prepared enzymatically (M. Grunberg-Manago, Progress in Nucleic Acid Research, Academic Press, New York, 1963, vol. 1, p. 108). The earlier methods of synthesis proved successful, but required the use of the specific arabino-nucleoside as a starting material.

This requirement is unsatisfactory for several reasons. First, the arabino-nucleosides are scarce and are themselves useful compounds so that it was undesirable to have to sacrifice such compounds as production intermediates. Secondly, because of the scarcity of the nucleosides, this method of synthesis proved quite expensive. A recent article by W. J. Wechter disclosed a method of synthesis typical of this earlier procedure. The Wechter synthesis involved the incorporation of the nucleoside 1-β-D-arabinofuranosyl cytosine into twenty-seven dinucleoside phosphates. These compounds were synthesized by the condensation of suitably protected nucleosides and nucleotides followed by deblocking (W. J. Wechter, "The Synthesis of Nucleotides and Dinucleoside Phosphates Containing Ara-Cytidine," 152 Meeting of the American Chemical Society, P-017, September 1966).

The present invention offers the first method for the preparation of 3'→5' linked arabino-olignoucleotides without the utilization of the scarce arabino-nucleosides as starting materials.

SUMMARY OF THE INVENTION

Generally the inventive process involves the synthesis of 3'→5' linked arabino-oligonucleotides by the base catalysed rearrangement of the nucleoside-2',3'-cyclic triesters. This method is significant because it eliminates the need for using the scarce arabino-nucleosides as starting materials. The arabino-oligonucleotides produced by this process have shown promise in preliminary testing as antiviral and carcinostatic agents.

DESCRIPTION OF THE PREFERRED EMBODIMENTS

One major approach to the synthesis of arabino-nucleosides leads through the intermediate cyclonucleosides which are formed from the ribonucleosides bearing proper leaving groups at the $C^{2'}$. Our studies on the reaction of phosphates with cyclonucleosides lead to a postulated intermediate nucleoside-2',3'-cyclic triester of the formula.

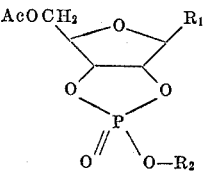

where $R_1$ represents cytosine, uracil or thymine; and where $R_2$ represents cytodine, uridine, or thymidine.

Such structure was found to be vulnerable to intramolecular nucleophilic attack in which the $C^{2'}$—O linkage is broken, and the phosphodiester itself acts as a leaving group. It was found that the triesters of the pyrimidine nucleoside 2',3'-cyclic phosphates can completely undergo a rearrangement to diesters containing $O^2$, 2'-cyclo nucleosides of the formula

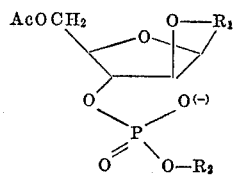

where $R_1$ represents uracil, cytosine or thymine; and where $R_2$ represents uridine, cytidine or thymidine. Alkaline hydrolysis of these labile intermediates produces the desired arabino-nucleosides so that the end product has the formula

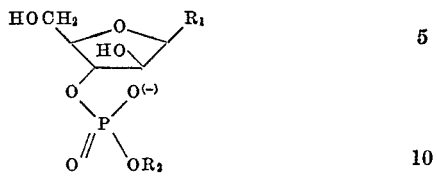

where $R_1$ represents cytosine, uracil or thymine; and where $R_2$ represents cytidine, uridine or thymidine.

While the essence of the invention should be evident to those skilled in the art from the foregoing general description, a further understanding of a mode of practicing said invention can be gained from the following specific examples.

EXAMPLE 1

Production of uridine nucleotides

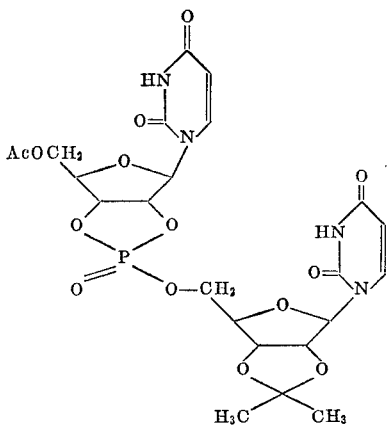

was generated by two methods: (1) through the reaction of 5′-acetyl uridine-2′,3′ cyclic phosphate with $O^2,5'$-cyclouridine, and later, (2) through the method of Michelson in which uridine can be directly used instead of cyclouridine. The first method is illustrated as a part of the total reaction scheme below:

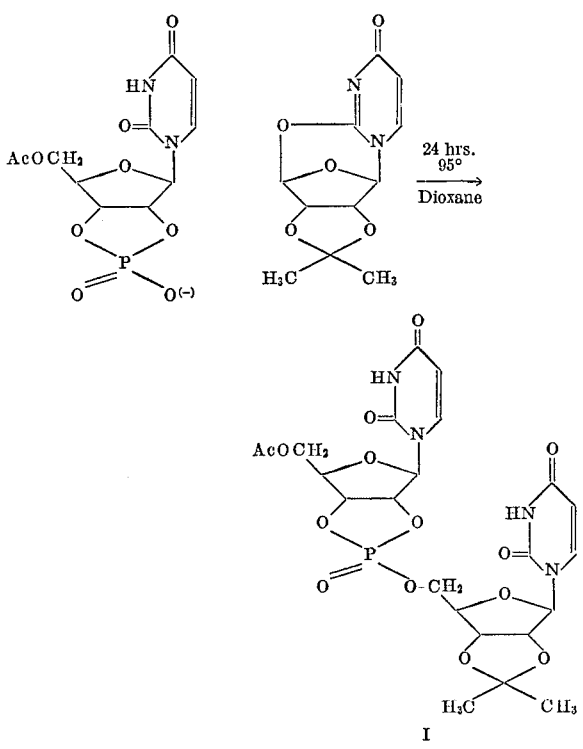

I

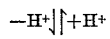

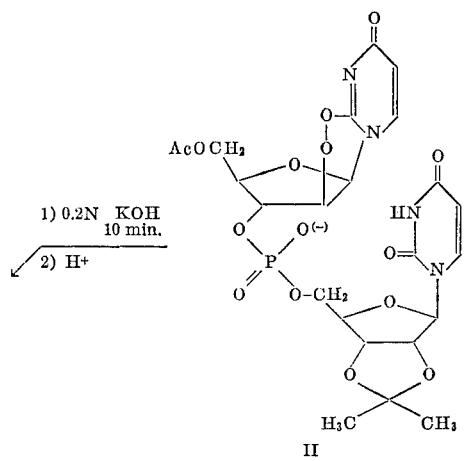

II

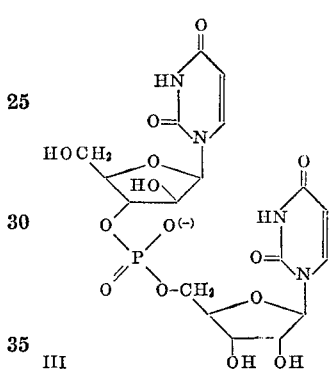

III

Use of this first method produced about a 50% yield for the arauridylyl (3′→5′) uridine, based on the cyclic phosphate. The second approach is characterized by shorter reaction time (5 hours at 90°) and yields up to 90%, and so it is preferable. For this approach we adapted the method developed by Michelson for the synthesis of polyribonucleotides (A. M. Michelson, "Synthesis and Properties of Some Polyribonucleotides," Journal of the Chemical Society, p. 1371, 1959; A. M. Michelson, "The Chemistry of Nucleosides and Nucleotides," Academic Press, London, New York, 1963, pp. 418–440). Following the Michelson approach for the synthesis of the intermediate compound I shown in the above reaction scheme, 5′-acetyl-uridine-2′,3′-cyclic phosphate and 2′,3′-isopropylideneuridine were condensed in a nonprotolytic solvent, such as dioxane or dimethylformamide, by the action of a variety of agents such as diplenyl phosphorochloridate, tetraphenyl pyrophosphate, triisopropylbenzenesulfamylchloride and the corresponding anhydrides in the presence of a tertiary base at room temperature for a few hours. Compound I was not isolated from these solutions, which upon heating in the temperature range of 60° to 120° during a period of 2 to 24 hours afforded compound II in better than 50% yield.

The correctness of the formulation shown in the above reaction was secured by the isolation of the stable cyclonucleoside diester II. This compound was in part converted by acidic hydrolysis to the isomeric 2′ and 3′ dinucleoside phosphate through intermediate I. $O^2,2'$-cyclouridine itself was isolated after snake venom phosphodiesterase hydrolysis of an unprotected cyclonucleoside diester. 1-β-D-Arabinofuranosyl-uracil was also isolated from enzymatic hydrolysis of III and identified through its chromatographic and spectroscopic (IR, UV) properties with the authentic material. The internucleotide linkage in III is stable to mild acid and mild alkali, and against pancreatic ribonuclease.

In the condensation, diphenylphosphoro chloride and triisopropylbenzenesulfonylchloride were used as activating agents.

When unprotected uridine-2',3'-cyclic phosphate was used in the above manner, a polymeric material consisting of a mixture of oligoarauridylic acids of different chain lengths was obtained. The examination of the polymers and characterization of their components is still in progress.

Any unprotected nucleoside added to the activated cyclic phosphate will appear at the 3' end of the oligonucleotides. Thus, oligonucleotides of arabino-uridine, 5-iododeoxyuridine, and deoxycytidine were prepared.

EXAMPLE 2

Production of cytidine nucleotides

A similar procedure was employed in the preparation of cytidine nucleotides. Here several complications arose, but successful results were still obtained. The amino group was first protected by acetylation. In this case, however, it appears that there is an equilibrium between the cyclic triester IV and the cyclonucleoside diester V of the formula

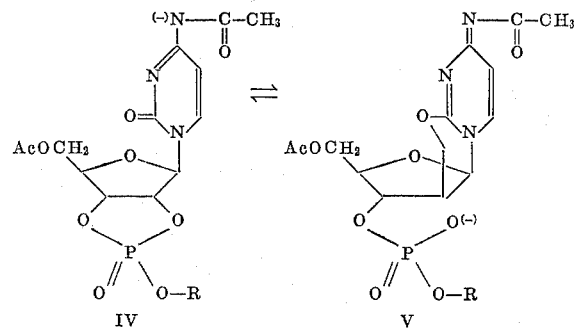

where R represents uridine, thymidine, or cytidine. Neither IV nor V are stable enough to be isolated.

After deblocking, ribonucleotides were always found in addition to the arabinonucleotides. Treatment of the reaction mixture with excess 1 N KOH, 20° overnight, and separation of the products, led to ara-Cpt in 30% yield. Similar reactions were also run with the five halogenated deoxyribonucleosides, where some of the products still await stricter characterization.

The protection of the NH₂ group as trimethylsilyl and pivalyl derivatives has a favorable effect on the equilibrium according to preliminary results. A substantial improvement in the yield of arabinosylcytosine nucleotides is expected.

While there have been described above what are at present considered preferred embodiments of the invention, it will be obvious to those skilled in the art that changes and modifications may be made without departing from the essence of the invention.

I claim:
1. A chemical process for the production of compounds of the class consisting of 3'→5' linked arabino-oligonucleotides of the formula

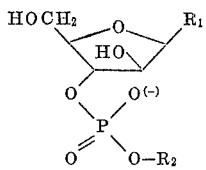

where $R_1$ is selected from the group consisting of uracil, cytosine, and thymine; and where $R_2$ is selected from the group consisting of uridine, cytidine, and thymidine; said process consisting of the base catalyzed rearrangement of triesters of pyrimidine nucleoside 2',3'-cyclic phosphates of the formula

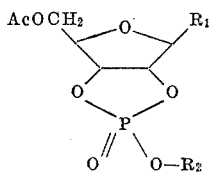

where $R_1$ is selected from the group consisting of uracil, cytosine, and thymine; and where $R_2$ is selected from the group consisting of uridine, cytidine, and thymidine to the diesters containing $O^2,2'$-cyclonucleosides, and alkaline hydrolysis of these labile intermediates to produce the desired arabino-nucleosides.

2. A process as claimed in claim 1 in which triesters of pyrimidine nucleoside 2',3'-cyclic phosphates were generated by the reaction of protected nucleoside 2', 3'-cyclic phosphates with $O^2,5'$-cyclonucleosides.

3. A process as claimed in claim 1 in which the desired end products are obtained by condensation.

4. A process as claimed in claim 1 in which triesters of pyrimidine nucleoside 2',3'-cyclic phosphates were generated by the activation of protected or unprotected nucleoside 2',3'-cyclic phosphates with a condensing agent, selected from the group consisting of diphenyl phosphorochloridate, tetraphenyl pyrophosphate, triisopropylbenzesulfonylchloride and the corresponding anhydrides, in the presence of a tertiary base at room temperature to produce the corresponding monomeric or polymeric triesters.

References Cited

UNITED STATES PATENTS 3,155,646  11/1964  Hunter _____ 260—211.5
3,183,226  5/1965  Hunter _____ 260—211.5

LEWIS GOTTS, Primary Examiner

JOHNNIE R. BROWN, Assistant Examiner